(No Model.)
A. McGREW.
CALCULATOR ATTACHMENT FOR SCALES.
No. 544,415. Patented Aug. 13, 1895.
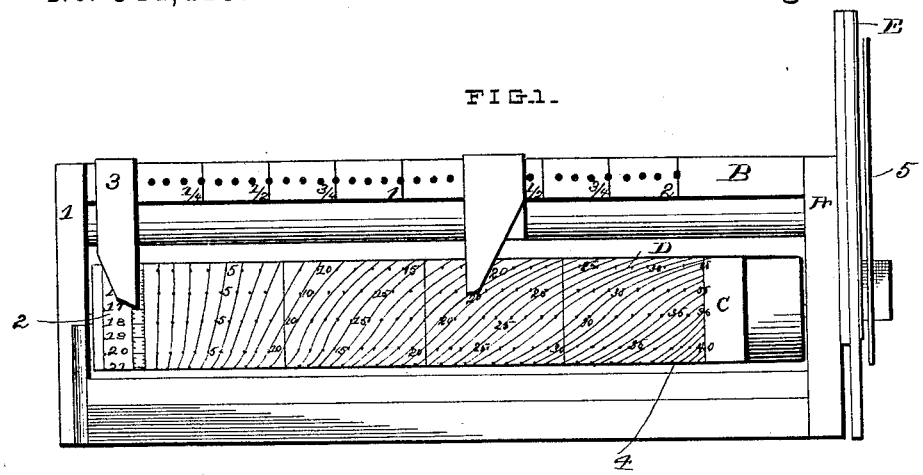
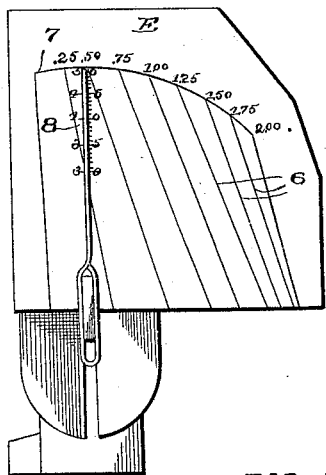
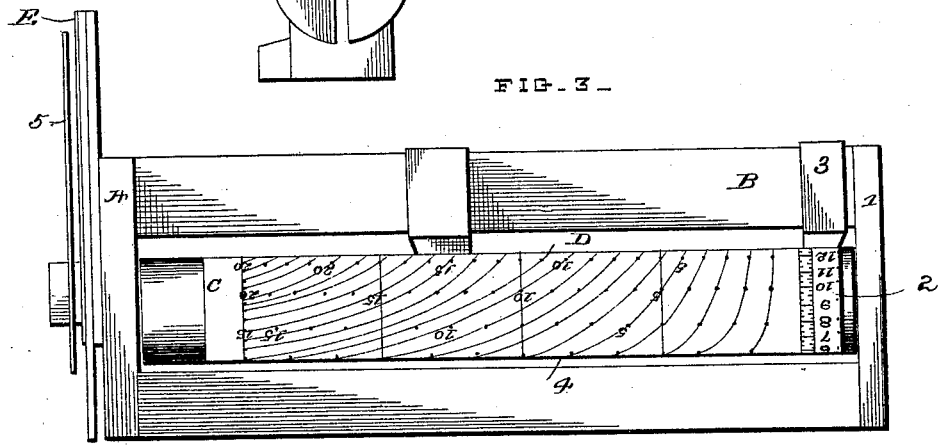
WITNESSES
Ada Bates
Dorsey Bates
INVENTOR
Alonzo McGrew
By W. C. Langan
Attorney

UNITED STATES PATENT OFFICE.

ALONZO McGREW, OF MADISONVILLE, KENTUCKY.

CALCULATOR ATTACHMENT FOR SCALES.

SPECIFICATION forming part of Letters Patent No. 544,415, dated August 13, 1895.

Application filed February 23, 1895. Serial No. 539,374. (No model.)

*To all whom it may concern:*

Be it known that I, ALONZO McGREW, a citizen of the United States, residing at Madisonville, in the county of Hopkins and State of Kentucky, have invented certain new and useful Improvements in Calculator Attachments for Scales; and I do hereby declare the following to be a full, clear, and exact description of the invention, such as will enable others skilled in the art to which it appertains to make and use the same.

My invention has relation to improvements in attachments for scale-beams, whereby the price per pound or fraction thereof, the weight, and the whole cost of any desired given quantity may be readily and accurately ascertained by the position of the pointers or indicators in their relation to the cylinder and scale-beam.

My invention also is applicable to the ascertainment of the amount per pound of the bushel cost, the weight to be had for a given amount of money at a given price per pound.

I accomplish the objects of my invention by the means of a graduated rotatable cylinder, a pound-price pointer, and a weight and cost pointer, and in case of having to reduce the cost per pound from bushel measure, by means of a graduated measure and weight scale associated with the graduated cylinder and scale-beam.

In the accompanying drawings, Figure 1 is a side elevation showing the device as set at a determined position. Fig. 2 is an end view in elevation showing the graduated scale of pounds and price per bushel with the indicating pointer or hand, and Fig. 3 is a side view showing the cylinder on opposite side to that shown in Fig. 1.

Referring to the drawings in designation of the several parts, A designates the beam-post, and B the scale-beam, which may be of any suitable make. The scale-beam in the drawings is marked off into ounce-graduations, and is for two pounds total capacity.

C designates a cylinder journaled at the ends thereof in suitable supports. I have shown it in the drawings as having one end journaled to the beam-post A and the other end journaled in a support 1. At one end of the cylinder is an annular scale 2, marked off into graduations indicating the prices per pound from 1 to 24, the price per pound being indicated by means of a pointer 3 arranged on the scale-beam and having its free end closely adjacent to or bearing on the annular price-scale, substantially as shown in the drawings.

D designates the cost-scale on the cylinder, indicating the cost of the purchase, and by reference to the scale-beam the weight of the article, goods, or commodity purchased. The lines of the cost-scale run spirally around the cylinder with gradually-increasing direction to horizontality from the starting-point, as shown in the drawings, and bearing at all places a proportional relation to give the total cost and the whole weight at that cost. All the cost-scale lines begin from a common base-line 4, and are directed around the cylinder at such divergence as to preserve the correct proportions and relation of the cost for the unit of the commodity to the whole cost of purchase and the weight thereof. On the outer end of the cylinder is fixed a hand or pointer 5 to turn therewith, and which stands vertical when the cylinder is turned to zero or base-line.

E designates a plate or dial having graduated lines 6 indicated thereon, the lines terminating in the circular border-line 7, and the intersections of the line 6 and border-line 7 having the cost per bushel marked thereat, as shown in the drawings in Fig. 2. The number of pounds to the bushel is marked on a vertically-arranged scale 8 on the plate E. This plate or dial is vertically movable and adjustable, so that the number of pounds of the bushel may be indicated by moving the plate up or down with the point or end of the pointer resting at the desired number and then by turning the pointer to the price-lines wanted the cylinder will be turned correspondingly and the price per pound indicated and ascertained thereon by the price-pointer on the annular scale 2.

The device may be attached to any beam-scale, and by the proper manipulation of the cylinder and dial, and knowing the number of pounds, yards, or bushels, the amount of goods and the entire cost thereof may be ascertained. The price per bushel is readily reduced to the price per pound, and the cost of any quantity within the measurement of the scale is ascertained by simply moving the weight-piece to the indications required.

Instances of manipulation will now be given. On the cylinder it will be observed that each line represents one cent value and increases by common notation, and the annular scale runs from 1 to 24 cents, being the cost per pound. The plate or dial has the number of pounds to the bushel and the price per bushel marked thereon. Now, to buy twenty cents worth of a commodity at seventeen cents per pound and ascertain the quantity which can be purchased the following is the operation: The cylinder is turned until the pointer 3 stands at 17, which is the price per pound, and then the slide-weight of the beam is moved out until the point thereof reaches the line marked 20, and on the scale-beam will be indicated one pound and not quite four ounces. Thus are indicated and ascertained both the cost and the weight of the commodity that is purchasable for that stated amount of money. Again, suppose it is wanted to buy five cents worth of meal held at one dollar and fifty cents per bushel, the meal weighing fifty pounds to the bushel. Set the dial vertically, so that the end of the pointer stands at 50, being the weight in pounds of a bushel of the meal, then turn the pointer until the end stands at 1.50 on the dial, being the price per bushel. The turning of the pointer also turns the cylinder until the pointer 3 at the annular scale for price per pound stands at 3 on the annular scale, which is the price per pound of the meal, then run the slide-weight out on the beam until its point reaches the five-cent line on the cylinder, and the correct weight (one pound and ten and two-thirds ounces) is indicated on the beam. Thus are given by three simple manipulations the number of pounds to the bushel, the price per bushel, and the cost of a given amount on the cylinder and the weight thereof on the beam.

Having thus described my invention, what I claim, and desire to secure by Letters Patent, is —

1. The combination with the scale-beam provided with weight-graduations, of a rotatable cylinder journaled adjacent thereto and provided with spirally arranged lines thereon bearing proportional relation to the graduation of the scale-beam, and an annular price-scale at one end, an indicator to designate the numbers on the price-scale, and a slide on the beam to indicate the weight on the beam and designate the whole cost on the lines of the cylinder together with the dial and the finger or indicator traversing the face of said dial, substantially as set forth.

2. The combination with the scale beam provided with a pointer or indicator at its inner end, and the slide on the beam to indicate the weight on the beam a cylinder journaled adjacent to the scale-beam and provided with an annular-scale of graduations at its end to indicate the price per pound, a vertically adjustable dial at the opposite end of the cylinder having a vertically arranged scale thereon to indicate the number of pounds to the bushel, and the graduated dial to indicate the cost per bushel, and a finger or pointer connected to the axle of the cylinder and traversing the face of the dial substantially as and for the purpose set forth.

3. The combination with the scale-beam provided with weight-graduations, of a rotatable cylinder provided with spirally arranged cost-lines thereon bearing proportional relation to the weight-graduations on the scale-beam and an annular price-scale at one end, an indicator to indicate the numbers on the annular price-scale, a slide on the beam to indicate the weight and designate the whole cost on the lines of the cylinder, a vertically adjustable dial having the weights and costs of bushels indicated thereon, and a pointer on the end of the cylinder to turn therewith, whereby the number of pounds and cost to the bushel, the price per pound, and the cost and weight of the amount purchased may be ascertained, as set forth.

In testimony whereof I affix my signature in presence or two witnesses.

ALONZO McGREW.

Witnesses:
T. H. SMITH,
CLINT RUBY.